United States Patent
Hanley et al.

(10) Patent No.: US 11,687,829 B2
(45) Date of Patent: Jun. 27, 2023

(54) ARTIFICIAL INTELLIGENCE RECOMMENDATION SYSTEM

(71) Applicant: Optum Services (Ireland) Limited, Dublin (IE)

(72) Inventors: Darragh Hanley, Dublin (IE); Damian Kelly, Kildare (IE); Julie Zhu, Minnetonka, MN (US); Jonathan Lawrence Herke, Maple Grove, MN (US); Gregory J. Boss, Saginaw, MI (US)

(73) Assignee: OPTUM SERVICES (IRELAND) LIMITED, Dublin (IE)

( * ) Notice: Subject to any disclaimer, the term of this patent is extended or adjusted under 35 U.S.C. 154(b) by 462 days.

(21) Appl. No.: 16/860,601

(22) Filed: Apr. 28, 2020

(65) Prior Publication Data
US 2021/0334697 A1 Oct. 28, 2021

(51) Int. Cl.
*G06F 15/16* (2006.01)
*G06F 9/54* (2006.01)
*H04L 29/06* (2006.01)
*G06N 20/00* (2019.01)
*G06N 5/02* (2023.01)

(52) U.S. Cl.
CPC .............. *G06N 20/00* (2019.01); *G06N 5/02* (2013.01)

(58) Field of Classification Search
CPC .................................. G06N 20/00; G06N 5/02
USPC ......................................................... 709/221
See application file for complete search history.

(56) References Cited

U.S. PATENT DOCUMENTS

| 10,963,941 | B2* | 3/2021 | Garcia Duran .... | G06Q 30/0282 |
|---|---|---|---|---|
| 11,188,937 | B2* | 11/2021 | Gao ........................ | H04L 67/55 |
| 11,200,284 | B1* | 12/2021 | Li ........................ | G06N 3/0454 |
| 11,301,540 | B1* | 4/2022 | Boteanu ................ | G06F 16/908 |
| 11,361,365 | B2* | 6/2022 | Greenwald ........... | G06F 16/248 |
| 2017/0262868 | A1* | 9/2017 | Manjunath ........... | G06Q 30/016 |
| 2018/0075137 | A1* | 3/2018 | Lifar ...................... | G06F 16/337 |
| 2018/0267977 | A1* | 9/2018 | Bandyopadhyay ......................... G06F 16/90335 |
| 2019/0043606 | A1* | 2/2019 | Roots ..................... | G16H 10/60 |
| 2019/0274010 | A1* | 9/2019 | Cirit ...................... | G08G 1/205 |
| 2019/0370854 | A1* | 12/2019 | Gao ...................... | H04L 67/535 |
| 2021/0334896 | A1* | 10/2021 | Sarshogh ............... | G06Q 10/10 |
| 2021/0406218 | A1* | 12/2021 | Margolin ................ | G06N 3/08 |
| 2022/0013106 | A1* | 1/2022 | Deng ..................... | G10L 13/047 |

FOREIGN PATENT DOCUMENTS

WO WO-2020123723 A1 * 6/2020 ........... A61B 5/7267

OTHER PUBLICATIONS

"AI in Healthcare: Google Advances in Predictive Analytics," Patents & Tech, 16 pages, (2019).
(Continued)

*Primary Examiner* — Hamza N Algibhah
(74) *Attorney, Agent, or Firm* — Alston & Bird LLP

(57) ABSTRACT

Various embodiments of the present disclosure facilitate recommendation prediction using machine learning. In one example, an embodiment provides for generating embeddings data related to one or more provider entities, predicting a set of provider entities for a patient entity based on a provider machine learning model, ranking provider entities in the set of provider entities to generate a ranked set of provider entities, and performing one or more actions to provide a recommendation for the patient entity based on the ranked set of provider entities.

20 Claims, 14 Drawing Sheets

(56) References Cited

OTHER PUBLICATIONS

Han et al., "A Hybrid Recommender System for Patient-Doctor Matchmaking in Primary Care," 2018 IEEE 5th International Conference on Data Science and Advanced Analytics (DSAA), pp. 481-490, (2018).
Sahoo et al., "DeepReco: Deep Learning Based Health Recommender System Using Collaborative Filtering," Computation, 7(2):25, 18 pages, (2019).
Shukla, Ravindra, "Developing a prescriptive recommender system through Matrix Factorization," Towards Data Science, 22 pages, (2019).

\* cited by examiner

| Feature Name 802 | Feature Value 804 | Hash Index 806 |
|---|---|---|
| Region | CA-Cupertino | feature 75407 |
| Prescription | prescription-"generic medication" | feature 8964 |
| Policy | url-website.com/policy-terms/1.0 | feature 322 |
| premium | premium | feature 1 |

```
                                          1200
┌─────────────────────────────────────────────────┐
│ GENERATE EMBEDDINGS DATA RELATED TO ONE OR MORE │
│  PROVIDER ENTITIES USING ONE OR MORE GRAPH      │
│           EMBEDDING TECHNIQUES                  │
│                    1202                         │
└─────────────────────────────────────────────────┘
                        │
                        ▼
┌─────────────────────────────────────────────────┐
│  TRAIN A MACHINE LEARNING MODEL BASED ON THE    │
│               EMBEDDINGS DATA                   │
│                    1204                         │
└─────────────────────────────────────────────────┘
                        │
                        ▼
┌─────────────────────────────────────────────────┐
│ PREDICT A SET OF PROVIDER ENTITIES FOR A PATIENT│
│      ENTITY BASED ON THE MACHINE LEARNING MODEL │
│                    1206                         │
└─────────────────────────────────────────────────┘
```

```
┌─────────────────────────────────────────────────────────────┐
│ GENERATE EMBEDDINGS DATA RELATED TO ONE OR MORE PROVIDER    │
│ ENTITIES USING ONE OR MORE FACTORIZATION MACHINES           │
│                         1302                                │
└─────────────────────────────────────────────────────────────┘
                              │
                              ▼
┌─────────────────────────────────────────────────────────────┐
│ TRAIN A MACHINE LEARNING MODEL BASED ON THE EMBEDDINGS      │
│                         DATA                                │
│                         1304                                │
└─────────────────────────────────────────────────────────────┘
                              │
                              ▼
┌─────────────────────────────────────────────────────────────┐
│ PREDICT A SET OF PROVIDER ENTITIES FOR A PATIENT ENTITY     │
│ BASED ON THE MACHINE LEARNING MODEL                         │
│                         1306                                │
└─────────────────────────────────────────────────────────────┘
```

FIG. 13

ARTIFICIAL INTELLIGENCE RECOMMENDATION SYSTEM

BACKGROUND

The present invention addresses technical challenges related to providing recommendations based on analysis of digital data in an accurate, computationally efficient and predictively reliable manner. Existing recommendation systems are generally ill-suited to accurately, efficiently and reliably provide recommendations in various domains, such as domains that are associated with high-dimensional categorical feature spaces with a high degree of size, diversity and/or cardinality.

BRIEF SUMMARY

In general, embodiments of the present invention provide methods, apparatus, systems, computing devices, computing entities, and/or the like for analysis of digital data using artificial intelligence. Certain embodiments utilize methods, apparatus, systems, computing devices, computing entities, and/or the like for additionally providing recommendations based on the analysis of the digital data. Additionally, in certain embodiments, methods, apparatus, systems, computing devices, computing entities, and/or the like provide for a machine learning solution and/or a graph solution that builds a recommendation scoring system to match an entity with an optimal selection of ranked results to satisfy criteria for one or more goals for the entity.

In accordance with one embodiment, a method is provided. In one embodiment, the method comprises generating embeddings data that encodes semantic relations among latent features for provider entities. The embeddings data comprises at least an embedding vector that provides a vector representation for a provider entity. The method also comprises predicting a set of provider entities for a patient entity based on a provider machine learning model that is trained using the embeddings data. A concatenation of user data for the patient entity and the embedding vector for the provider entity is provided to a machine learning network cell of the provider machine learning model. A machine learning network layer communicatively coupled to the machine learning network cell provides a prediction for the set of provider entities. The method also comprises ranking provider entities in the set of provider entities to generate a ranked set of provider entities. Furthermore, the method comprises performing one or more actions to provide a recommendation for the patient entity based on the ranked set of provider entities.

In accordance with another embodiment, an apparatus comprising at least one processor and at least one memory including computer program code is provided. In one embodiment, the at least one memory and the computer program code can be configured to, with the processor, cause the apparatus to: generate embeddings data that encodes semantic relations among latent features for provider entities, predict a set of provider entities for a patient entity based on a provider machine learning model that is trained using the embeddings data, rank provider entities in the set of provider entities to generate a ranked set of provider entities, and perform one or more actions to provide a recommendation for the patient entity based on the ranked set of provider entities. The embeddings data comprises at least an embedding vector that provides a vector representation for a provider entity. Furthermore, a concatenation of user data for the patient entity and the embedding vector for the provider entity is provided to a machine learning network cell of the provider machine learning model, and a machine learning network layer communicatively coupled to the machine learning network cell provides a prediction for the set of provider entities.

In accordance with yet another embodiment, a computer program product is provided. The computer program product can comprise at least one non-transitory computer-readable storage medium comprising instructions, the instructions being configured to cause one or more processors to at least perform operations configured to: generate embeddings data that encodes semantic relations among latent features for provider entities, predict a set of provider entities for a patient entity based on a provider machine learning model that is trained using the embeddings data, rank provider entities in the set of provider entities to generate a ranked set of provider entities, and perform one or more actions to provide a recommendation for the patient entity based on the ranked set of provider entities. The embeddings data comprises at least an embedding vector that provides a vector representation for a provider entity. Furthermore, a concatenation of user data for the patient entity and the embedding vector for the provider entity is provided to a machine learning network cell of the provider machine learning model, and a machine learning network layer communicatively coupled to the machine learning network cell provides a prediction for the set of provider entities.

BRIEF DESCRIPTION OF THE DRAWINGS

Figure 1:
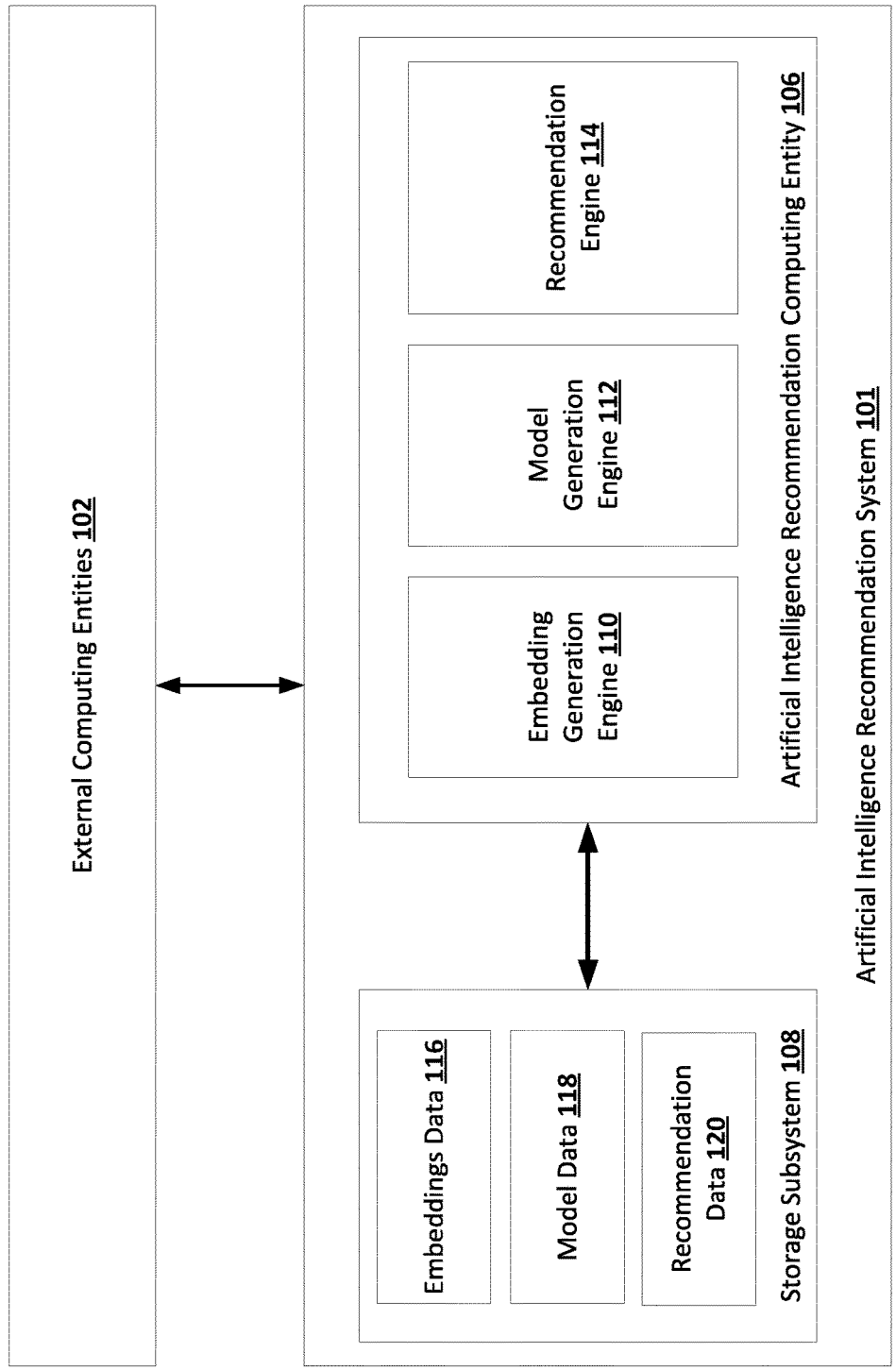

Having thus described the invention in general terms, reference will now be made to the accompanying drawings, which are not necessarily drawn to scale, and wherein:

FIG. 1 provides an exemplary overview of an architecture that can be used to practice one or more embodiments of the present invention.

Figure 2:
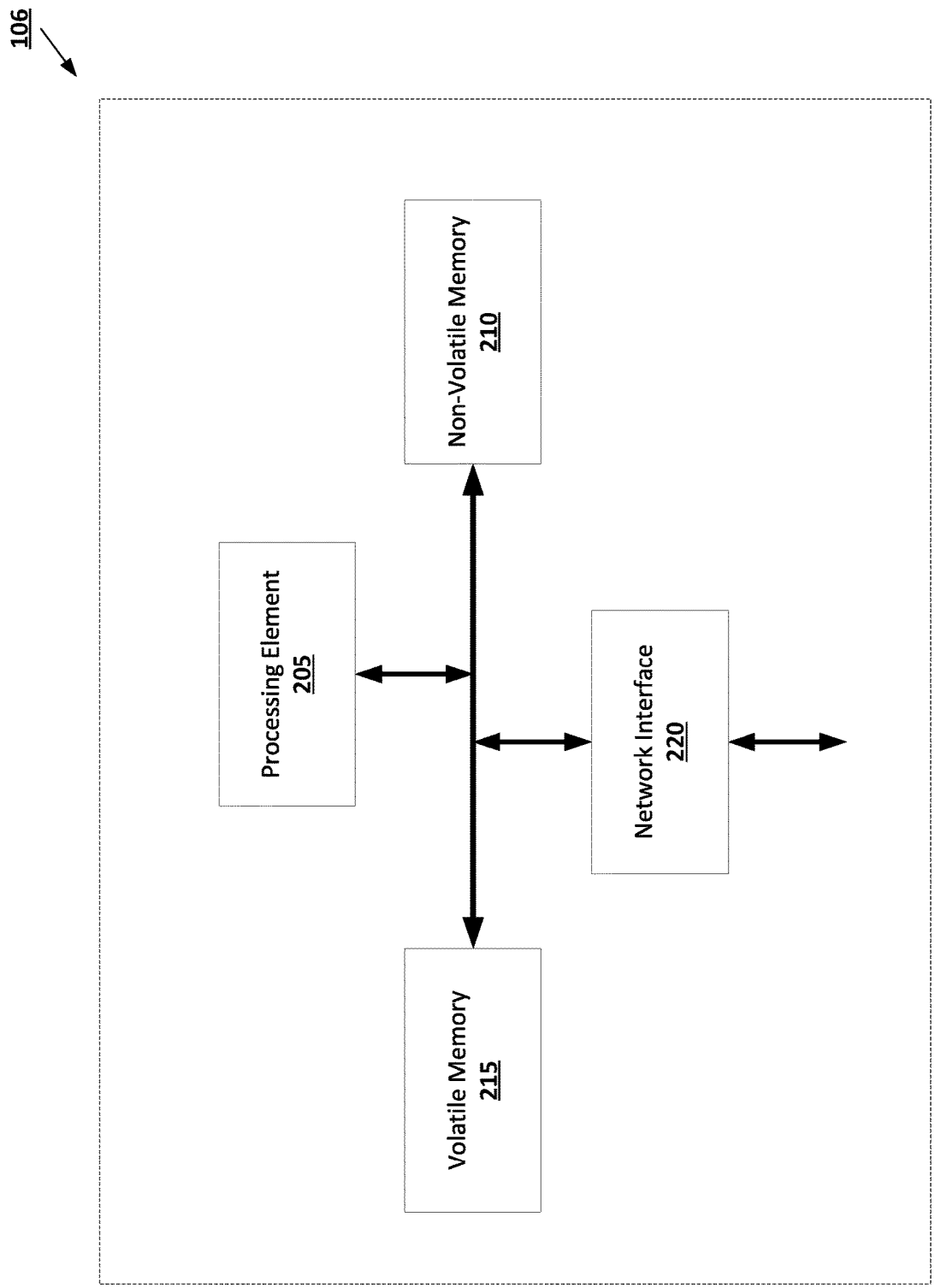

FIG. 2 provides an example artificial intelligence recommendation computing entity in accordance with one or more embodiments discussed herein.

Figure 3:
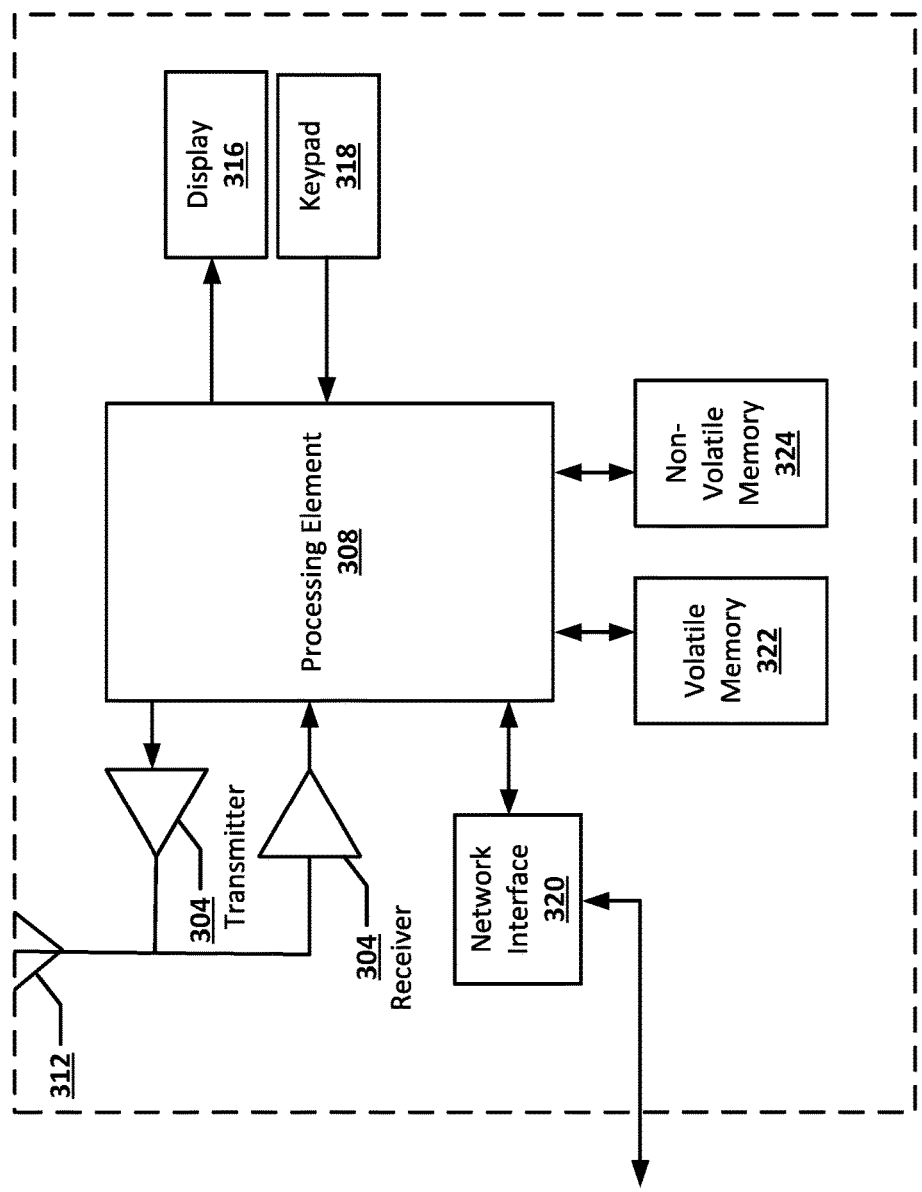

FIG. 3 provides an example external computing entity in accordance with one or more embodiments discussed herein.

Figure 4:
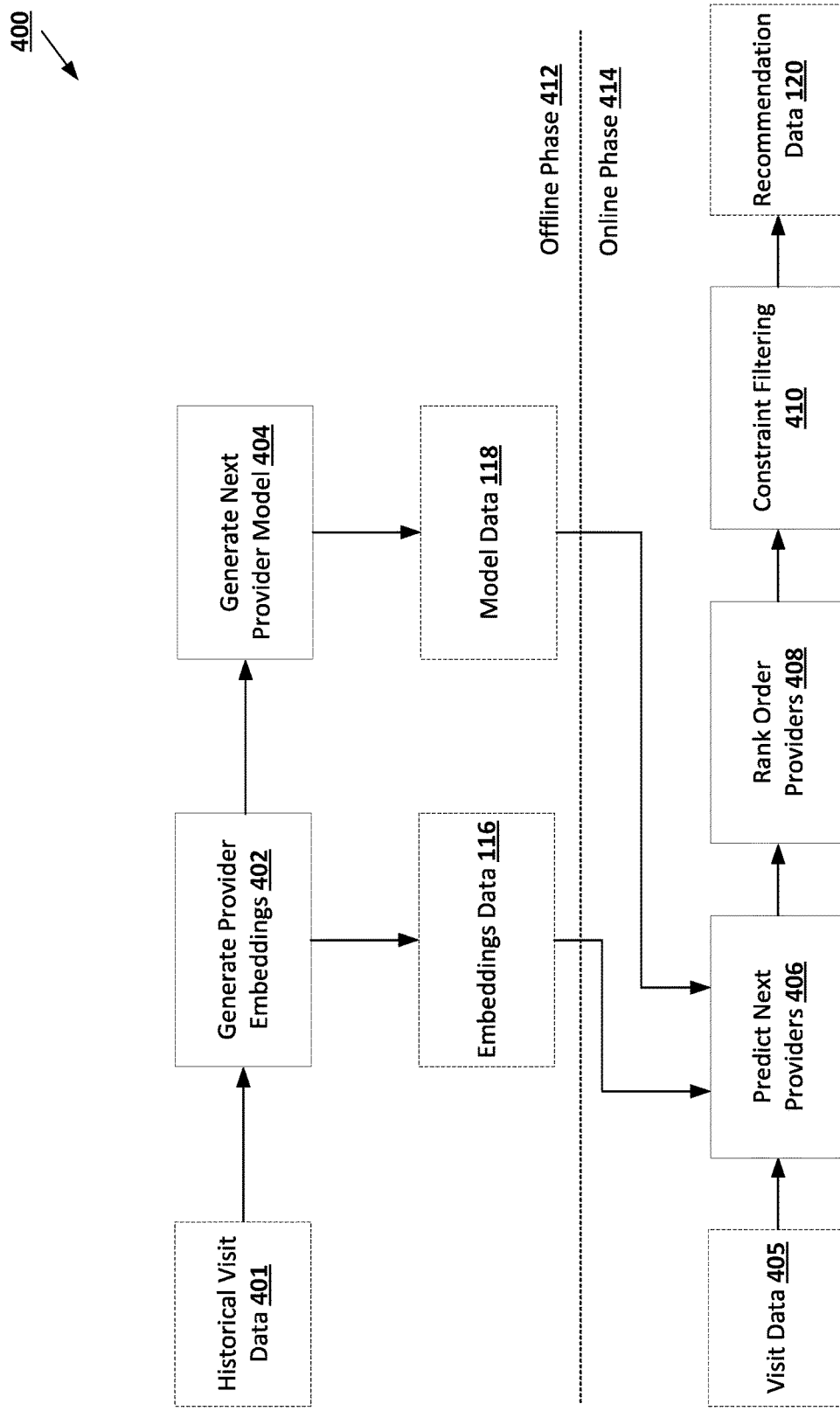

FIG. 4 is a flowchart diagram of an example process for performing next-provider recommendation using machine learning and/or graph representations in accordance with one or more embodiments discussed herein.

Figure 5:
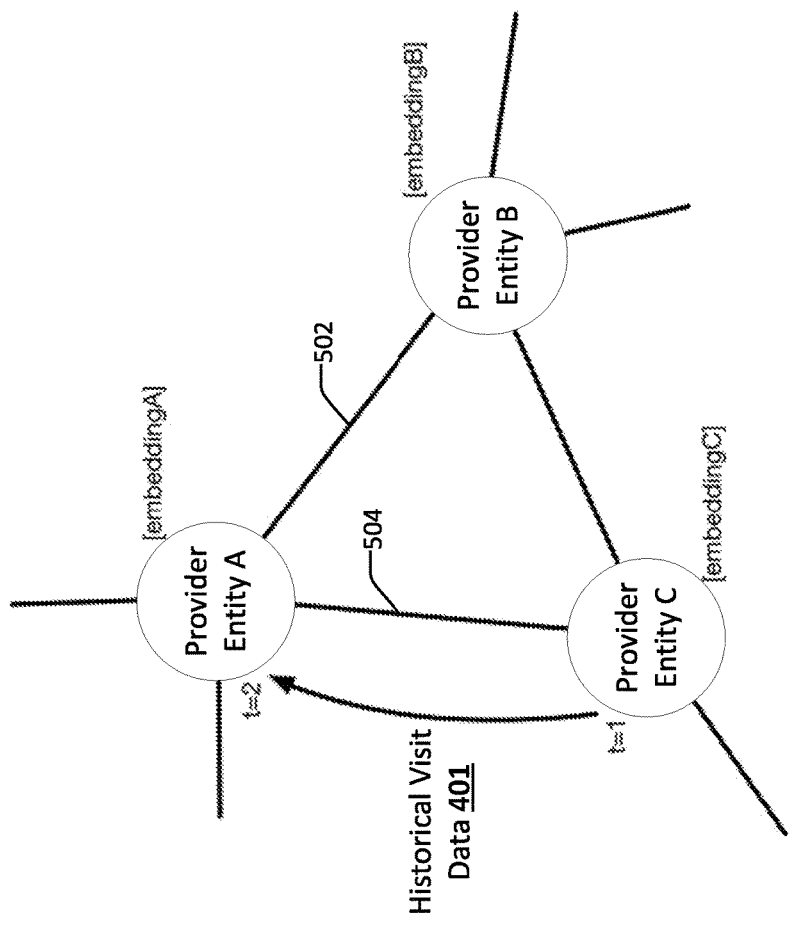

FIG. 5 provides an example system associated with an embedding graph in accordance with one or more embodiments discussed herein.

Figure 6:

FIG. 6 provides an example system associated with matrix factorization in accordance with one or more embodiments discussed herein.

Figure 7:
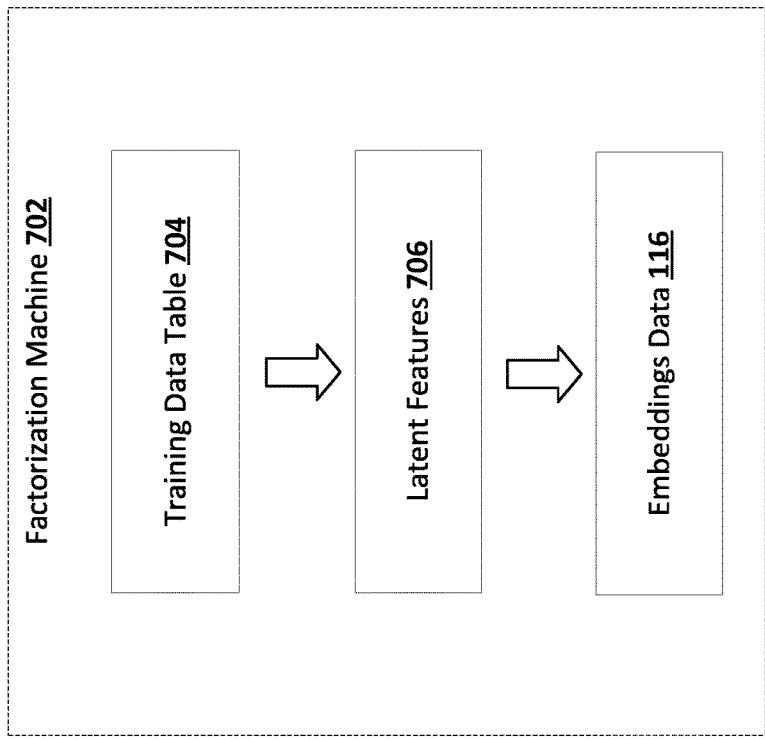

FIG. 7 provides an example system associated with a factorization machine in accordance with one or more embodiments discussed herein.

FIG. 8 provides an example system associated with latent features in accordance with one or more embodiments discussed herein.

Figure 9:
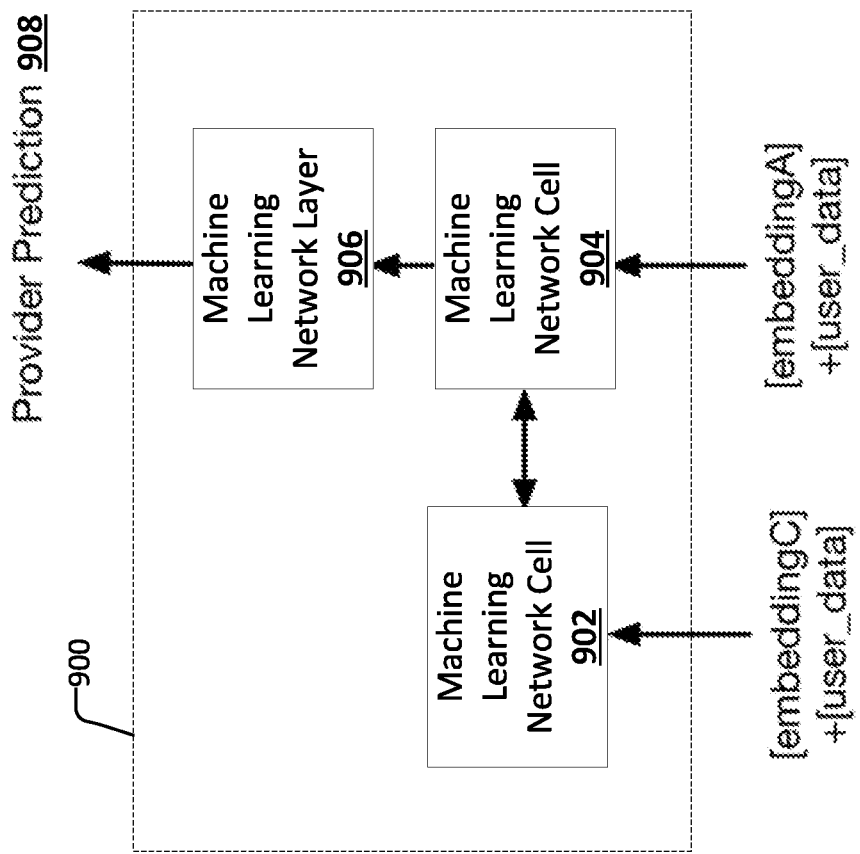

FIG. 9 provides an example machine learning model in accordance with one or more embodiments discussed herein.

Figure 10:
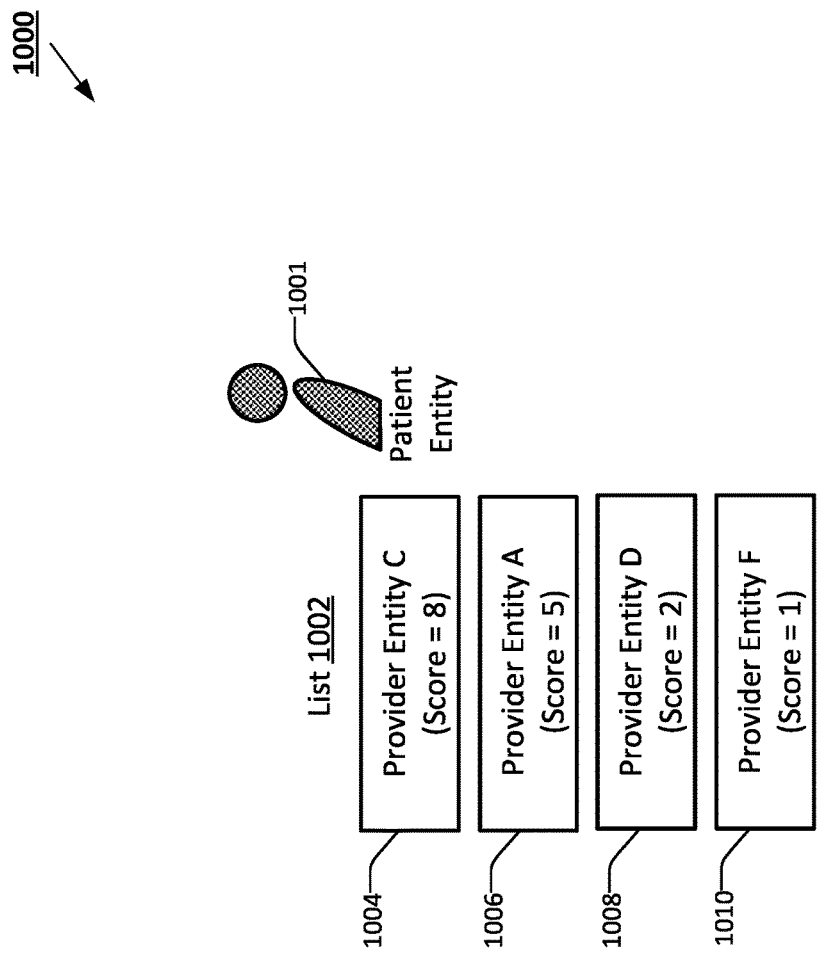

FIG. 10 provides an example system associated with recommendation data in accordance with one or more embodiments discussed herein.

Figure 11:
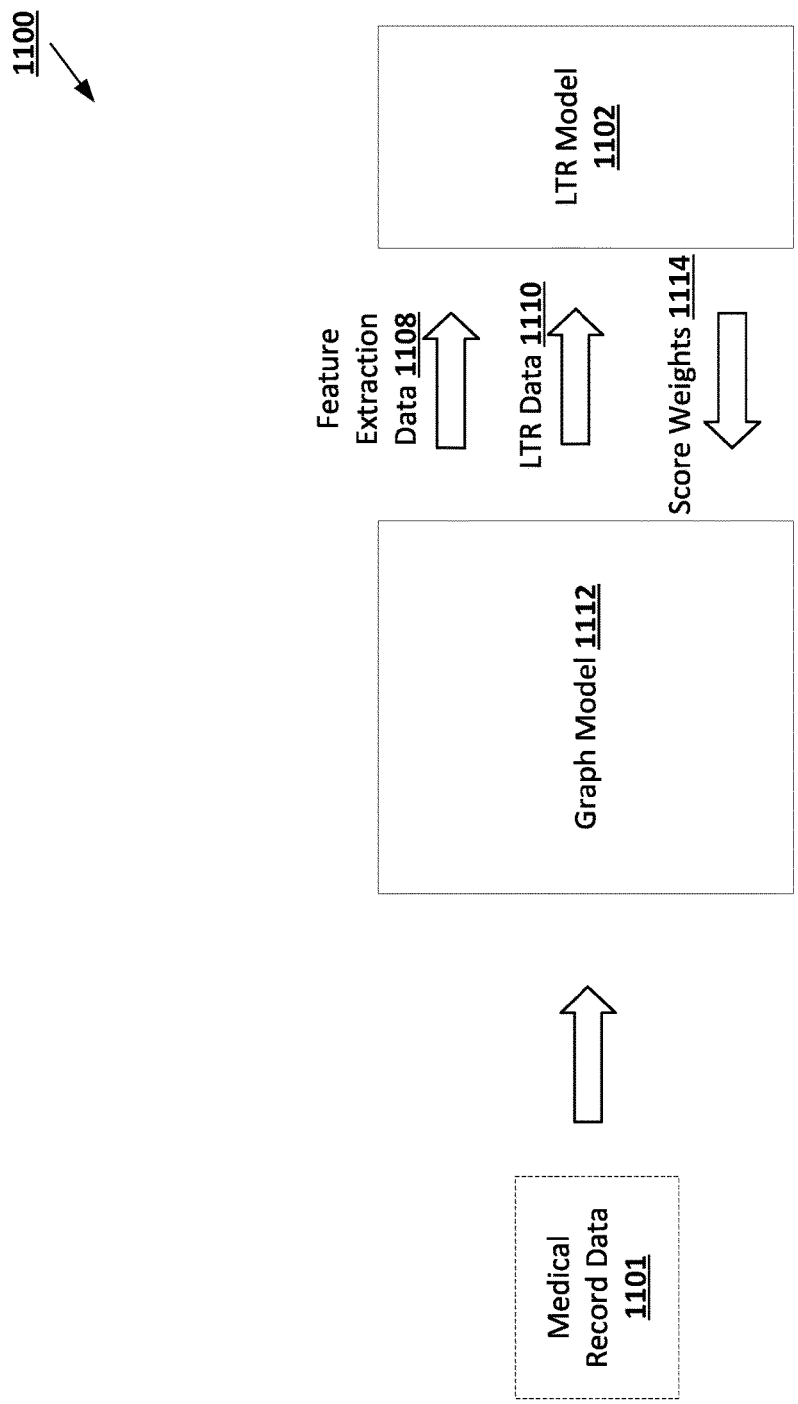

FIG. 11 provides an example system associated with likelihood to recommend scores in accordance with one or more embodiments discussed herein.

FIG. 12 is a flowchart diagram of an example process for facilitating provider entity prediction using graph embedding in accordance with one or more embodiments discussed herein.

FIG. 13 is a flowchart diagram of an example process for facilitating provider entity prediction using factorization machines in accordance with one or more embodiments discussed herein.

Figure 14:
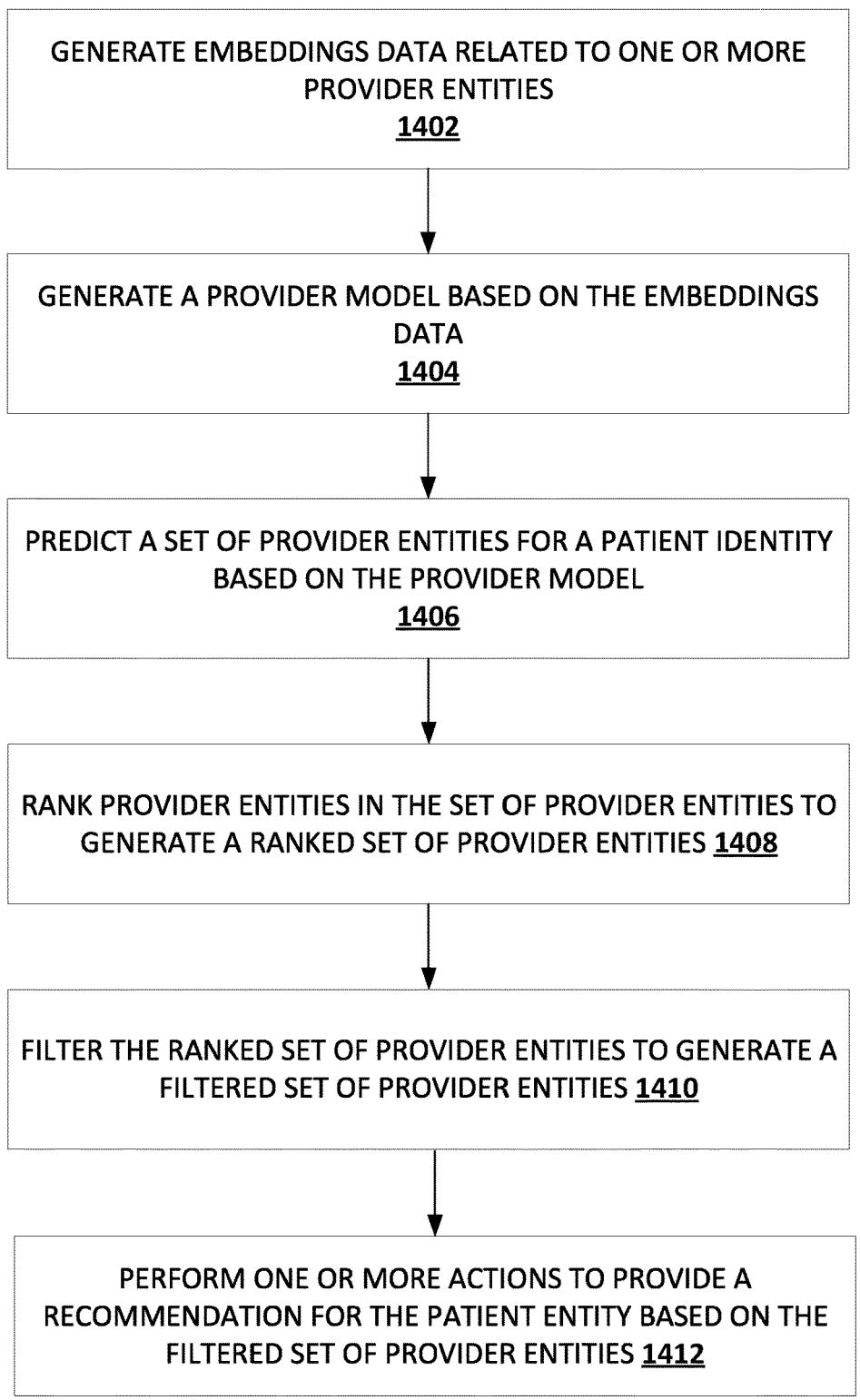

FIG. 14 is a flowchart diagram of an example process for facilitating recommendation prediction using machine learning and graph representations in accordance with one or more embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Discussed herein are methods, apparatus, systems, computing devices, computing entities, and/or the like to facilitate recommendation prediction using artificial intelligence. As will be recognized, the disclosed concepts can be used to perform any type of artificial intelligence for recommendation prediction. Examples of artificial intelligence include, but are not limited to, machine learning, supervised machine learning, unsupervised machine learning, deep learning, neural network architectures, etc.

Health care providers are often specialized to provide certain services. Furthermore, services provided by different health care providers can differ significantly in an ability to assist patients with certain conditions. Different health care providers also often demonstrate different patterns of effectiveness across symptom domains and/or functioning domains. For example, not all health care providers are skilled in treating all kinds of health conditions. Additionally, when patients seek specific health care, doctors often refer them to providers by chance and/or convenience. Moreover, a patient generally searches for a health care provider using details such as geographic data (e.g., a zip code) and symptoms (e.g., mapping to diagnosis codes) to receive recommendations for predefined provider groups based on diagnosis codes, a percentage of patients who employed each of the medical providers for a given search query, etc. Thus, there is a technical need for predictive data analysis solutions that are capable of accurately, efficiently and/or reliably performing predictive data analysis in prediction domains with complex input spaces.

Various embodiments of the present invention address technical challenges related to accurately, efficiently and/or reliably match an entity with an optimal selection of ranked results. For example, in some embodiments, proposed solutions disclose a recommendation system to match an entity with an optimal selection of ranked results to satisfy criteria for one or more goals for the entity. Additionally, in some embodiments, proposed solutions disclose an optimal recommendation of a provider entity from a set of provider entities. In some embodiments, a machine learning model to facilitate the optimal recommendation can be generated based on embeddings for respective provider entities. After the machine learning model is generated, the machine learning model can be utilized to perform accurate, efficient and reliable predictive data analysis related to optimal recommendation of a provider entity from a set of provider entities.

Additionally, various embodiments of the present invention disclose various techniques for providing a machine learning graph recommendation system. Examples of such techniques include employing graph embedding techniques to generate provider embeddings to solve deficiencies with respect to conventional recommendation systems. Examples of such techniques additionally or alternatively include employing factorization machines and/or matrix factorization to generate provider embeddings to solve deficiencies with respect to conventional recommendation systems. In an embodiment, a machine learning model can be generated to sequentially predict and/or recommend a provider entity based on calculated provide embeddings and/or patient encounter metadata from current encounters and/or previous encounters with respect to provider entities. In addition, given a rank ordering of provider entities (e.g., based on probabilities and/or ranking distances), one or more constraints can be applied to the provider entities.

In certain embodiments, a feature hash can be employed to allow features to fit in a defined space, to allow new features to be easily added, and/or to provide improved training data. Examples of such techniques also include use of graph technology by factorization machines. The factorization machines can generate embeddings for weights between graph nodes to facilitate calculation of similarity between entities (e.g., between provider entities and patient entities). Accordingly, by employing various techniques for providing a machine learning graph recommendation system, various embodiments of the present invention enable utilizing efficient and reliable machine learning solutions to process high-dimensional categorical feature spaces with a high degree of size, diversity and/or cardinality. In doing so, various embodiments of the present invention address shortcomings of existing recommendation system solutions and enable solutions that are capable of accurately, efficiently and/or reliably performing predictive data analysis related to optimal recommendation of a provider entity from a set of provider entities.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 provides an exemplary overview of an architecture 100 that can be used to practice embodiments of the present invention. The architecture 100 includes an artificial intelligence recommendation system 101 and one or more external computing entities 102. For example, at least some of the one or more external computing entities 102 can provide medical records inputs and/or goal data inputs to the artificial intelligence recommendation system 101 and receive recommendation outputs from the artificial intelligence recommendation system 101 in response to providing the medical records inputs and/or the goal data inputs. As another example, at least some of the external computing entities 102 can provide one or more data streams and/or one or more batch loads to the artificial intelligence recommendation system 101 and request performance of particular prediction-based actions in accordance with the provided one or more data streams and/or one or more batch loads. As a further example, at least some of the external computing entities 102 can provide training data to the artificial intelligence recommendation system 101 and request training of a predictive model (e.g., a predictive machine learning model) in accordance with the provided training data. In some of the noted embodiments, the artificial intelligence recommendation system 101 can be configured to transmit parameters, hyper-parameters, and/or weights of a trained machine learning model to the external computing entities 102.

In some embodiments, the artificial intelligence recommendation system 101 can include an artificial intelligence recommendation computing entity 106. The artificial intelligence recommendation computing entity 106 and the external computing entities 102 can be configured to communicate over a communication network (not shown). The communication network can include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

Additionally, in some embodiments, the artificial intelligence recommendation system 101 can include a storage subsystem 108. The artificial intelligence recommendation computing entity 106 can be configured to provide a recommendation prediction using one or more artificial intelligence techniques. For instance, the artificial intelligence recommendation computing entity 106 can be configured to provide an optimal recommendation of a provider entity from a set of provider entities. In some embodiments, an embedding generation engine 110 of the artificial intelligence recommendation computing entity 106 can generate embeddings data 116 that includes respective embeddings for respective provider entities. The embedding generation engine 110 of the artificial intelligence recommendation computing entity 106 can generate the embeddings data 116, for example, based on historical visit data (e.g., historical visit data 401 shown in FIG. 4) provided by the external computing entities 102. In an embodiment, the embedding generation engine 110 of the artificial intelligence recommendation computing entity 106 can generate the embeddings data based on one or more graph embedding techniques. In another embodiment, the embedding generation engine 110 of the artificial intelligence recommendation computing entity 106 can generate the embeddings data based on one or more factorization machines. Additionally, in some embodiments, a model generation engine 112 of the artificial intelligence recommendation computing entity 106 can generate model data 118 that includes one or more machine learning models for recommendation prediction. The model generation engine 112 of the artificial intelligence recommendation computing entity 106 can generate the model data 118, for example, based on the embeddings data 116 and/or user data provided by the external computing entities 102. Additionally, in some embodiments, a recommendation engine 114 of the artificial intelligence recommendation computing entity 106 can generate recommendation data 120 that includes an optimal recommendation of a provider entity from a set of provider entities. The recommendation engine 114 of the artificial intelligence recommendation computing entity 106 can employ the model data 118 (e.g., the one or more machine learning models) to generate the recommendation data 120. As such, the artificial intelligence recommendation computing entity 106 can provide accurate, efficient and/or reliable predictive data analysis related to optimal recommendation of a provider entity from a set of provider entities. Further example operations of the embedding generation engine 110, the model generation engine 112 and/or the recommendation engine 114 are described with reference to FIGS. 4-14.

In an embodiment, the embeddings data 116, the model data 118 and/or the recommendation data 120 can be stored in a storage subsystem 108. The storage subsystem 108 can include one or more storage units, such as multiple distributed storage units that are connected through a computer network. Each storage unit in the storage subsystem 108 can store at least one of one or more data assets and/or one or more data about the computed properties of one or more data assets. Moreover, each storage unit in the storage subsystem 108 can include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of the artificial intelligence recommendation computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes can include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the artificial intelligence recommendation computing entity 106 can also include a network interface 220 for communicating with various computing entities, such as by communicating data, content, information, and/or similar terms used herein interchangeably that can be transmitted, received, operated on, processed, displayed, stored, and/or the like. Furthermore, it is to be appreciated that the network interface 220 can include one or more network interfaces.

As shown in FIG. 2, in one embodiment, the artificial intelligence recommendation computing entity 106 can include or be in communication with processing element 205 (also referred to as processors, processing circuitry, and/or similar terms used herein interchangeably) that communicate with other elements within the artificial intelligence recommendation computing entity 106 via a bus, for example. It is to be appreciated that the processing element 205 can include one or more processing elements. As will be understood, the processing element 205 can be embodied in a number of different ways. For example, the processing element 205 can be embodied as one or more complex programmable logic devices (CPLDs), microprocessors, multi-core processors, coprocessing entities, application-specific instruction-set processors (ASIPs), microcontrollers, and/or controllers. Further, the processing element 205 can be embodied as one or more other processing devices or circuitry. The term circuitry can refer to an entirely hardware embodiment or a combination of hardware and computer program products. Thus, the processing element 205 can be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 can be configured for a particular use or configured to execute instructions stored in volatile or non-volatile media or otherwise accessible to the processing element 205. As such, whether configured by hardware or computer program products, or by a combination thereof, the processing element 205 can be capable of performing steps or operations according to embodiments of the present invention when configured accordingly.

In one embodiment, the artificial intelligence recommendation computing entity 106 can further include or be in communication with non-volatile memory 210. The non-volatile memory 210 can be non-volatile media (also referred to as non-volatile storage, memory, memory storage, memory circuitry and/or similar terms used herein interchangeably). Furthermore, in an embodiment, non-volatile memory 210 can include one or more non-volatile storage or memory media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media can store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably can refer to a collection of records or data that is stored in a computer-readable storage medium using one or more database models, such as a hierarchical database model, network model, relational model, entity-relationship model, object model, document model, semantic model, graph model, and/or the like.

In one embodiment, the artificial intelligence recommendation computing entity 106 can further include or be in communication with volatile memory 215. The volatile memory 215 can be volatile media (also referred to as volatile storage, memory, memory storage, memory circuitry and/or similar terms used herein interchangeably). Furthermore, in an embodiment, the volatile memory 215 can include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media can be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like can be used to control certain aspects of the operation of the artificial intelligence recommendation computing entity 106 with the assistance of the processing element 205 and operating system.

As indicated, in one embodiment, the artificial intelligence recommendation computing entity 106 can also include the network interface 220. In an embodiment, the network interface 220 can be one or more communications interfaces for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the artificial intelligence recommendation computing entity 106 can be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the artificial intelligence recommendation computing entity 106 can include or be in communication with one or more input elements, such as a keyboard input, a mouse input, a touch screen/display input, motion input, movement input, audio input, pointing device input, joystick input, keypad input, and/or the like. The artificial intelligence recommendation computing entity 106 can also include or be in communication with one or more output elements (not shown), such as audio output, video output, screen/display output, motion output, movement output, and/or the like.

B. Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably can refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The external computing entity 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, can include signaling information/data in accordance with air interface standards of applicable wireless systems. In this regard, the external computing entity 102 can be capable of operating with one or more air interface standards, communication protocols, modulation types, and access types. More particularly, the external computing entity 102 can operate in accordance with any of a number of wireless communication standards and protocols, such as those described above with regard to the artificial intelligence recommendation computing entity 106. In a particular embodiment, the external computing entity 102 can operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 can operate in accordance with multiple wired communication standards and protocols, such as those described above with regard to the artificial intelligence recommendation computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 can include location determining aspects, devices, modules, functionalities, and/or similar words used herein interchangeably. For example, the external computing entity 102 can include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites can be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 can include indoor positioning aspects, such as a location module adapted to acquire, for example, latitude, longitude, altitude, geocode, course, direction, heading, speed, time, date, and/or various other information/data. Some of the indoor systems can use various position or location technologies including RFID tags, indoor beacons or transmitters, Wi-Fi access points, cellular towers, nearby computing devices (e.g., smartphones, laptops) and/or the like. For instance, such technologies can include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 can also comprise a user interface (that can include a display 316 coupled to the processing element 308) and/or a user input interface (coupled to the processing element 308). For example, the user interface can be a user application, browser, user interface, and/or similar words used herein interchangeably executing on and/or accessible via the external computing entity 102 to interact with and/or cause display of information/data from the artificial intelligence recommendation computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and can include a full set of alphabetic keys or set of keys that can be activated to provide a full set of alphanumeric keys. In addition to providing input, the user input interface can be used, for example, to activate or deactivate certain functions, such as screen savers and/or sleep modes.

The external computing entity 102 can also include volatile memory 322 and/or non-volatile memory 324, which can be embedded and/or can be removable. For example, the non-volatile memory can be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory can be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile memory 322 and/or the non-volatile memory 324 can store databases, database instances, database management systems, data, applications, programs, program modules, scripts, source code, object code, byte code, compiled code, interpreted code, machine code, executable instructions, and/or the like to implement the functions of the external computing entity 102. As indicated, this can include a user application that is resident on the entity or accessible through a browser or other user interface for communicating with the artificial intelligence recommendation computing entity 106 and/or various other computing entities.

In another embodiment, the external computing entity 102 can include one or more components or functionality that are the same or similar to those of the artificial intelligence recommendation computing entity 106, as described in greater detail above. As will be recognized, these architectures and descriptions are provided for exemplary purposes only and are not limiting to the various embodiments.

In various embodiments, the external computing entity 102 can be embodied as an artificial intelligence (AI) computing entity, such as a virtual assistant AI device, and/or the like. Accordingly, the external computing entity 102 can be configured to provide and/or receive information/data from a user via an input/output mechanism, such as a display, a camera, a speaker, a voice-activated input, and/or the like. In certain embodiments, an AI computing entity can comprise one or more predefined and executable program algorithms stored within an onboard memory storage module, and/or accessible over a network. In various embodiments, the AI computing entity can be configured to retrieve and/or execute one or more of the predefined program algorithms upon the occurrence of a predefined trigger event.

IV. EXEMPLARY SYSTEM OPERATIONS

In general, embodiments of the present invention provide methods, apparatus, systems, computing devices, computing entities, and/or the like for recommendation prediction using artificial intelligence. Certain embodiments of the systems, methods, and computer program products that facilitate recommendation prediction employ one or more machine learning models and/or one or more machine learning techniques.

Various embodiments of the present invention address technical challenges related to accurately, efficiently and/or reliably performing predictive data analysis in prediction domains. For example, in some embodiments, proposed solutions disclose a recommendation system to match an entity with an optimal selection of ranked results to satisfy criteria for one or more goals for the entity. In some embodiments, proposed solutions disclose an optimal recommendation of a provider entity from a set of provider entities. In some embodiments, a machine learning model to facilitate the optimal recommendation can be generated based on embeddings for respective provider entities. After the machine learning model is generated, the machine learning model can be utilized to perform accurate, efficient and reliable predictive data analysis related to optimal recommendation of a provider entity from a set of provider entities.

Recommendation Data Using Machine Learning

FIG. 4 illustrates an example system 400 for performing next-provider recommendations using machine learning and/or graph representations. The system 400 includes a step/operation 402 performed by the embedding generation engine 110 of the artificial intelligence recommendation computing entity 106 to generate provider embeddings, a step/operation 404 performed by the model generation engine 112 of the artificial intelligence recommendation computing entity 106 to generate a next provider model, a step/operation 406 performed by the recommendation engine 114 of the artificial intelligence recommendation computing entity 106 to predict next providers, a step/operation 408 performed by the recommendation engine 114 of the artificial intelligence recommendation computing entity 106 to rank order providers, and/or a step/operation 410 performed by the recommendation engine 114 of the artificial intelligence recommendation computing entity 106 for constraint filtering. In certain embodiments, the step/operation 402 and/or the step/operation 404 can be performed via an offline phase 412 associated with training (e.g., a training phase for a machine learning process). Additionally or alternatively, the step/operation 406, the step/operation 408, and/or the step/operation 410 can be performed via an online phase 414 associated with predicted inference (e.g., an inference phase for a machine learning process).

In an embodiment, historical visit data 401 can be employed by the step/operation 402 to generate provider embeddings. For example, the step/operation 402 can generate the embeddings data 116 based on the historical visit data 401. The historical visit data 401 can be, for example, historical data related to one or more previous visits to one or more patient entities by one or more patients. In certain embodiments, the historical visit data 401 can include data related to one or more previous medical records, data related to historical patient data provider visits, data related to one or more previous medical claims, data related to one or more previous diagnosis, data related to one or more previous symptoms, data related to one or more previous clinical visits, data related to one or more geographic locations for one or more previous visits, data related to one or more previous prescriptions, data related to one or more previous policies, data related to one or more previous premiums, and/or other data related to one or more previous visits by one or more patient entities.

In another embodiment, the provider embeddings can be associated with a graph domain. Furthermore, the provider embeddings can be employed to represent connectivity between provider entities more efficiently than adjacency matrices. For example, the provider embeddings can enable a 10 k×50 matrix to represent embedding vector space differences between the providers entities. In an aspect, the provider embeddings can employ latent features to capture similarity between provider entities along particular dimensions. Provider entities with similar properties and/or similar member affinities can be represented with a close relationship in the embedding space. Furthermore, embedding representations of provider properties can be more efficient inputs for machine learning models due to dense representations associated with the provider embeddings. The provider embeddings can be precalculated using embedding graph networks for factorization machines, in certain embodiments.

In some embodiments, step/operation 402 can be performed in accordance with a system 500 depicted in FIG. 5. The system 500 can be, for example, an embedding graph network that includes a Provider Entity A, a Provider Entity B and a Provider Entity C. The Provider Entity A, the Provider Entity B and/or the Provider Entity C can be, for example, nodes of the embedding graph network. Edges of the embedding graph network can also be employed to represent connectivity and/or relationships between the Provider Entity A, the Provider Entity B and/or the Provider Entity C. Furthermore, the system 500 illustrates an example scenario in which a provider entity (e.g., the Provider Entity A, the Provider Entity B or the Provider Entity C) to recommend to a given patient entity is predicted. For example, as depicted in FIG. 5, a patient entity can be currently at Provider Entity A after being at Provider entity C during a previous encounter. In an aspect, the Provider Entity A, the Provider Entity B and/or the Provider Entity C can be assigned an embedding vector. For example, the Provider Entity A can be assigned a first embedding vector (e.g., [embeddingA] shown in FIG. 5), the Provider Entity B can be assigned a second embedding vector (e.g., [embeddingB] shown in FIG. 5), and the Provider Entity C can be assigned a third embedding vector (e.g., [embeddingC] shown in FIG. 5).

The first embedding vector (e.g., [embeddingA]) for the Provider Entity A, the second embedding vector (e.g., [embeddingB]) for the Provider Entity B, and/or the third embedding vector (e.g., [embeddingC]) for the Provider Entity C can be determined using one or more graph embedding techniques. The one or more graph embedding techniques can be one or more machine learning techniques associated with deep learning and/or graph walks to transform a graph structure with nodes (e.g., nodes represented by the Provider Entity A, the Provider Entity B and/or the Provider Entity C) and/or edges into a vector space for the embedding vectors. For instance, the one or more graph embedding techniques can include a random walk graph embedding technique, a DeepWalk graph embedding technique, a Node2Vec graph embedding technique, a Graph2Vec graph embedding technique, a structural deep network embeddings (SDNE) graph embedding technique, a large-scale information network embeddings (LINE) graph embedding technique and/or one or more other types of graph embedding techniques.

The random walk graph embedding technique can, for example, randomly traverse through nodes (e.g., nodes represented by the Provider Entity A, the Provider Entity B and/or the Provider Entity C) of the graph structure to transform the graph structure into a vector space for the embedding vectors. The DeepWalk graph embedding technique can, for example, perform a series of randomly traversals through nodes (e.g., nodes represented by the Provider Entity A, the Provider Entity B and/or the Provider Entity C) of the graph structure based on latent representations of respective nodes to transform the graph structure into a vector space for the embedding vectors. The Node2Vec graph embedding technique can, for example, perform a series of traversals through nodes (e.g., nodes represented by the Provider Entity A, the Provider Entity B and/or the Provider Entity C) of the graph structure based on a walk bias variable associated with a traversal route to transform the graph structure into a vector space for the embedding vectors. The Graph2Vec graph embedding technique can for example, perform a series of traversals through nodes (e.g., nodes represented by the Provider Entity A, the Provider Entity B and/or the Provider Entity C) of the graph structure based on a set of sub-graphs for the graph structure to transform the graph structure into a vector space for the embedding vectors. The SDNE graph embedding technique can for example, analyze nodes (e.g., nodes represented by the Provider Entity A, the Provider Entity B and/or the Provider Entity C) of the graph structure based on a first-order similarity measure of nodes based on shared edges and/or a second-order similarity measure of nodes based on shared neighboring nodes to transform the graph structure into a vector space for the embedding vectors. The LINE graph embedding technique can for example, analyze nodes (e.g., nodes represented by the Provider Entity A, the Provider Entity B and/or the Provider Entity C) of the graph structure based on probability distributions associated with a first-order similarity measure of nodes based on shared edges and/or a second-order similarity measure of nodes based on shared neighboring nodes to transform the graph structure into a vector space for the embedding vectors.

Additionally or alternatively, the first embedding vector (e.g., [embeddingA]) for the Provider Entity A, the second embedding vector (e.g., [embeddingB]) for the Provider Entity B, and/or the third embedding vector (e.g., [embeddingC]) for the Provider Entity C can be determined using one or more factorization machines. The one or more factorization machines can employ one or more machine learning techniques associated with deep learning and/or supervised learning to transform a graph structure with nodes (e.g., nodes represented by the Provider Entity A, the Provider Entity B and/or the Provider Entity C) and/or edges into a vector space for the embedding vectors. In an aspect, the one or more factorization machines can generate one or more hash indexes for one or more variables included in the historical visit data 401. The one or more factorization machines can also generate a unique label for the Provider Entity A, the Provider Entity B and/or the Provider Entity C. Furthermore, the one or more factorization machines can perform matrix factorization to facilitate learning for historical visits associated with the Provider Entity A, the Provider Entity B and/or the Provider Entity C. In an embodiment, a formulation φ for a factorization machine can be represented by the following equation:

$$\phi(w, x) = \sum_{j_1, j_2 \in C_2} (w_{j_1}, w_{j_2}) x_{j_1} x_{j_2}$$

where $w_{j1}$ is a first vector with length k, $w_{j2}$ is a second vector with length k, and k is a defined integer parameter.

In some embodiments, matrix factorization can be performed in accordance with a system 600 depicted in FIG. 6. For instance, the system 600 includes an embeddings matrix 602, a provider entity matrix 604 and a latent feature matrix 606. The embeddings matrix 602 can be a matrix where rows represent provider entities and columns represent latent features. For example, the embeddings matrix 602 can include a first row for a provider entity A with respective values for a first latent feature W, a second latent feature X, a third latent feature Y and a fourth latent feature Z. Furthermore, the embeddings matrix 602 can include a second row for a provider entity B with respective values for a first latent feature W, a second latent feature X, a third latent feature Y and a fourth latent feature Z. The embeddings matrix 602 can also include a third row for a provider entity C with respective values for a first latent feature W, a second latent feature X, a third latent feature Y and a fourth latent feature Z. Furthermore, the embeddings matrix 602 can include a fourth row for a provider entity D with respective values for a first latent feature W, a second latent feature X, a third latent feature Y and a fourth latent feature Z. The provider entity matrix 604 and the latent feature matrix 606 can be lower dimensionality rectangular matrices with respect to the embeddings matrix 602. In an aspect, the matrix factorization can transform the embeddings matrix 602 into a product of the provider entity matrix 604 and the latent feature matrix 606. For instance, the provider entity matrix 604 can include transformed values associated with the provider entity A, the provider entity B, the provider entity C and the provider entity D. Furthermore, the latent feature matrix 606 can include transformed values associated with the first latent feature W, the second latent feature X, the third latent feature Y and the fourth latent feature Z.

Additionally, in some embodiments, a factorization machine can be configured in accordance with a system 700 depicted in FIG. 7. The system 700 can include a factorization machine 702. The factorization machine 702 can be, for example, a factorization machine employed to determine the first embedding vector (e.g., [embeddingA]) for the Provider Entity A, the second embedding vector (e.g., [embeddingB]) for the Provider Entity B, and/or the third embedding vector (e.g., [embeddingC]) for the Provider Entity C. In certain embodiments, the factorization machine 702 can employ one or more matrix factorization techniques such as, for example, the matrix factorization illustrated in FIG. 6. In an embodiment, the factorization machine 702 can generate and/or employ a training data table 704. The training data table 704 can include, for example, data associated with hashed latent features and/or data associated with historical visits from the historical visit data 401. The training data table 704 can also be employed as training data for a machine learning model (e.g., the model data 118). The factorization machine 702 can additionally or alternatively generate and/or employ latent features 706.

The latent features 706 can include one or more latent variables associated with the training data table 704. For example, the latent features 706 can include one or more latent variables associated with the historical visits from the historical visit data 401. In a non-limiting example, the latent features 706 can include a location variable, a region variable, a prescription variable, a policy variable, a premium variable, a specialty variable, a claim count variable, an average charged amount variable, a patient count variable, an age distribution variable, a gender variable, a distribution variable, a size of clinic variable, a symptom variable, a quality variable, an assessment variable, a ratio of complained visits variable, a ranked diagnosis code variable, a repeated appointment variable, a score variable, and/or another type of variable related to the historical visit data 401. In an aspect, the latent features 706 can include one or more latent variables per feature. Furthermore, in certain embodiments, the latent features 706 can be associated with a latent space (e.g., a data array) associated with respective values for the latent variables. The factorization machine 702 can additionally or alternatively generate the embeddings data 116. For example, one or more of the latent features 706 can be combined, formatted, concatenated and/or transformed into the embeddings data 116. In an aspect, the embeddings data 116 can be a mapping of the latent features 706 to a vector representation for the latent features 706. In addition, the embeddings data 116 can be formatted in a suitable format for machine learning and/or can encode semantic relations among the latent features 706.

In an embodiment, the latent features 706 can be associated with hash indexes for the one or more latent variables. The hash indexes can be generated, in some embodiments, in accordance with a system 800 depicted in FIG. 8. The system 800 includes latent features (e.g., the latent features 706) associated with a feature name 802 and a feature value 804. A hash index 806 can also be generated for the feature name 802 and the feature value 804. For example, the latent features 706 can include a "Region" variable with a value equal to "CA-Cupertino" and a hash index equal to 75407. In another example, the latent features 706 can include a "Prescription" variable with a value equal to "prescription-"generic medication"" and a hash index equal to 8964. In yet another example, the latent features 706 can include a "Policy" variable with a value equal to "url-website.com/policy-terms/1.0" and a hash index equal to 322. In yet another example, the latent features 706 can include a "premium" variable with a value equal to "premium" and a hash index equal to 1. As such, a hashed variable can be generated for respective latent features of the latent features 706.

In another aspect, a distance between respective embedding vectors for the Provider Entity A, the Provider Entity B and/or the Provider Entity C can represent a strength in connectivity between provider entities. For instance, referring back to FIG. 5, a first distance represented by an edge 502 between the Provider A and the Provider B (e.g., a distance between the first embedding vector [embeddingA] and the second embedding vector [embeddingA]) can correspond to a degree of similarity between the Provider A and the Provider B. Furthermore, a second distance represented by an edge 504 between the Provider A and the Provider c (e.g., a distance between the first embedding vector [embeddingA] and the third embedding vector [embeddingC]) can correspond to a degree of similarity between the Provider A and the Provider C. In an example, a length of the edge 502 can be shorter than a length of the edge 504 in response to a determination that the Provider A is more similar to the Provider B than the Provider C. In another example, a length of the edge 502 can be longer than a length of the edge 504 in response to a determination that the Provider A is more similar to the Provider C than the Provider B. In yet another aspect, the connectivity and/or relationships between the Provider Entity A, the Provider Entity B and/or the Provider Entity C can be determined based on the historical visit data 401. For example, at least a portion of the historical visit data 401 can be employed to determine a length of the edge 504. In another example, patient referral history data from the historical visit data 401 can be employed to determine a length of the edge 504.

The step/operation 402 can employ one or more techniques to determine connectivity and/or relationships between the Provider Entity A, the Provider Entity B and/or the Provider Entity C based on the historical visit data 401. For instance, in an embodiment, the step/operation 402 can analyze the historical visit data 401 to determine information related to a number of patients that transitioned to a particular provider entity within N days of being observed by another provider entity, where N is an integer. Additionally or alternatively, in another embodiment, the step/operation 402 can analyze the historical visit data 401 to determine information related to referrals made from a particular provider entity to another provider entity. Additionally or alternatively, in yet another embodiment, the step/operation 402 can analyze the historical visit data 401 to determine information related to a patient providing a particular provider entity and another provider entity with a corresponding diagnosis code or a similar diagnosis code.

The historical visit data 401 and/or the embeddings data 116 can also be employed by the step/operation 404 to generate a next provider model. For example, the step/operation 402 can generate the model data 118 based on the historical visit data 401 and/or the embeddings data 116. The next provider model (e.g., the next provider model represented by the model data 118) can be a machine learning model (e.g., a deep learning model, a sequential deep learning model, etc.) that predicts a next provider entity. In an embodiment, the next provider model can be configured in accordance with a machine learning model 900 depicted in FIG. 9. The machine learning model 900 can include a machine learning network cell 902, a machine learning network cell 904, and/or a machine learning network layer 906. The machine learning network cell 902 can be an artificial neural network cell such as, but not limited to, a recurrent neural network (RNN) cell, a long short-term memory (LSTM) cell, a gated recurrent units (GRU) cell, and/or another type of artificial neural network cell. Similarly, the machine learning network cell 904 can be an artificial neural network cell such as, but not limited to, a RNN cell, a LSTM cell, a GRU cell, and/or another type of artificial neural network cell.

Referring back to FIG. 4, in another embodiment, visit data 405, the embeddings data 116, and/or the model data 118 can be employed by the step/operation 406 to predict next providers. The visit data 405 can be related to one or more visits of a particular patient entity to one or more provider entities. For example, the visit data 405 can be, for example, data related to one or more visits to one or more patient entities by one or more patients. In certain embodiments, the visit data 405 can include data related to one or more medical records, data related to one or more patient data provider visits, data related to one or more medical claims, data related to one or more diagnosis, data related to one or more symptoms, data related to one or more clinical visits, data related to one or more geographic locations for one or more visits, data related to one or more prescriptions, data related to one or more policies, data related to one or more premiums, and/or other data related to one or more visits by one or more patient entities. In certain embodiments, the visit data 405 can include one or more goals for the patient entity. For example, the visit data 405 can include one or more preferences and/or one or more desired treatments for a medical condition and/or a medical diagnosis related to the patient entity. As such, the step/operation 406 can employ data from the offline phase 412 (e.g., the embeddings data 116, and/or the model data 118) in combination with data from the online phase 414 (e.g., the visit data 405) to provide the next providers for a particular patient entity given data related to historical encounters with respect to one or more provider entities.

In an aspect, the step/operation 406 can employ a sequence of provider entity encounters to predict the next providers. For example, if a particular patient entity has only made a single visit to a provider entity with no historical provider visits, an encounter sequence of length one can be provided. Furthermore, any data for previous provider encounters can extend a length of the encounter sequence to provide more useful context for the prediction. In an embodiment, for each encounter in a sequence, an embedding vector for a particular provider entity can be retrieved. Furthermore, a user vector can be generated. The user vector can be, for example, a concatenation of fixed user features and/or per-visit user features. In addition, the user vector and the embedding vector the particular provider entity can be concatenated to form combined vector associated with a vector per encounter for the particular patient entity. The combined vector can include provider entity data and member data for the particular encounter. In another embodiment, the sequence of per-encounter vectors can be provided as input to the machine learning model associated with the model data 118 to obtain a prediction for a next provider. The prediction for the next provider can be a multi-output (e.g., with respective scores per provider) or a single vector output (e.g. an embedding for the predicted provider).

Referring back to FIG. 9, based on at least a portion of the embeddings data 116 (e.g., the first embedding vector [embeddingA] and the third embedding vector [embeddingC]) and/or user data (e.g., [user_data]), the machine learning model 900 can generate a provider prediction 908. The provider prediction 908 can predict the next providers, for example. For instance, in an embodiment, the provider prediction 908 can provide a prediction for a set of provider entities. In an aspect, the machine learning model 900 can receive a concatenation of the embeddings data 116 and the user data. For example, at each timestep during a machine learning process, the machine learning model 900 can receive a concatenation of the embeddings data 116 and the user data. In an embodiment as shown in FIG. 9, the machine learning network cell 902 can receive a concatenation of the first embedding vector [embeddingA] and the user data (e.g., [user_data]). Furthermore, the machine learning network cell 904 can receive a concatenation of the second embedding vector [embeddingC] and the user data (e.g., [user_data]).

In an example, the third embedding vector [embeddingC] provided to the machine learning network cell 902 can be a vertex embedding related to a visit of a particular user to the Provider Entity C. Additionally or alternatively, the vertex embedding associated with the third embedding vector [embeddingC] can be related to a concatenation of latent features (e.g., the latent features 706). The user data (e.g., [user_data]) provided to the machine learning network cell 902 can include a concatenation of fixed user features and/or per-visit features for the user that visits the Provider Entity C. The fixed user features can include one or more features of the user that is not related to the visit to the Provider Entity C. For example, the fixed user features can include health condition data, pre-existing health condition data, demographic data, health plan data, location data and/or other data associated with the user that visits the Provider Entity C. The fixed user features for the user that visits the Provider Entity C can be represented as an embedding, a feature-hashed, an n-hot encoded representation, and/or another type of encoded representation of the fixed user features. The per-visit user features can include one or more features of the user that is related to the visit to the Provider Entity C. For example, the per-visit user features can include encounter-diagnosed health condition data, other diagnosed condition data, procedures data, consulting physician specialty data, searched keywords data (e.g., when querying for the Provider Entity C). The per-visit user features for the user that visits the Provider Entity C can be represented as an embedding, a feature-hashed, an n-hot encoded representation, and/or another type of encoded representation of the per-visit features.

Additionally, the first embedding vector [embeddingA] provided to the machine learning network cell 904 can be a vertex embedding related to a visit of a particular user to the Provider Entity A. Additionally or alternatively, the vertex embedding associated with the first embedding vector [embeddingA] can be related to a concatenation of latent features (e.g., the latent features 706). The user data (e.g., [user_data]) provided to the machine learning network cell 904 can include a concatenation of fixed user features and/or per-visit features for the user that visits the Provider Entity A. The fixed user features can include one or more features of the user that is not related to the visit to the Provider Entity A. For example, the fixed user features can include health condition data, pre-existing health condition data, demographic data, health plan data, location data and/or other data associated with the user that visits the Provider Entity A. The fixed user features for the user that visits the Provider Entity A can be represented as an embedding, a feature-hashed, an n-hot encoded representation, and/or another type of encoded representation of the fixed user features. The per-visit user features can include one or more features of the user that is related to the visit to the Provider Entity A. For example, the per-visit user features can include encounter-diagnosed health condition data, other diagnosed condition data, procedures data, consulting physician specialty data, searched keywords data (e.g., when querying for the Provider Entity A). The per-visit user features for the user that visits the Provider Entity A can be represented as an embedding, a feature-hashed, an n-hot encoded representation, and/or another type of encoded representation of the per-visit features. As such, the machine learning model 900 can employ long-standing health conditions, current-encounter health conditions, and/or other patient metadata to generate the provider prediction 908.

The machine learning network cell 902 can process the third embedding vector [embeddingC] and/or the user data to provide a model related to the third embedding vector [embeddingC] and/or the user data. In an aspect, the machine learning network cell 902 can apply one or more transformation to the third embedding vector [embeddingC] and/or the user data to facilitate generation of the model related to the third embedding vector [embeddingC] and/or the user data. Furthermore, the machine learning network cell 902 can employ one or more machine learning techniques to facilitate generation of the model related to the third embedding vector [embeddingC] and/or the user data. In one example, the model related to the third embedding vector [embeddingC] and/or the user data can be formatted as a vector. In another aspect, the machine learning network cell 904 can process the first embedding vector [embeddingA] and/or the user data to provide a model related to the first embedding vector [embeddingA] and/or the user data. The machine learning network cell 904 can apply one or more transformation to the first embedding vector [embeddingA] and/or the user data to facilitate generation of the model related to the first embedding vector [embeddingA] and/or the user data. Furthermore, the machine learning network cell 904 can employ one or more machine learning techniques to facilitate generation of the model related to the first embedding vector [embeddingA] and/or the user data. In one example, the model related to the first embedding vector [embeddingA] and/or the user data can be formatted as a vector.

The machine learning model 900 can also include a machine learning network layer 906. In an aspect, the machine learning network cell 902 and/or the machine learning network cell 904 can be communicatively coupled to the machine learning network layer 906 to facilitate generation of the provider prediction 908. For example, the machine learning network cell 902 can provide the model associated with the third embedding vector [embeddingC] and/or the user data to the machine learning network layer 906. Additionally, the machine learning network cell 904 can provide the model associated with the first embedding vector [embeddingA] and/or the user data to the machine learning network layer 906. The machine learning network layer 906 can be, for example, a dense layer associated with one or more linear operations and/or a non-linear activation function to facilitate generation of the provider prediction 908. For instance, the machine learning network layer 906 can be a fully-connected layer that performs a linear operation with respect to the model provided by the machine learning network cell 902 and/or the machine learning network cell 904. A non-linear activation function can additionally or alternatively be applied to the model provided by the machine learning network cell 902 and/or the machine learning network cell 904. In an example, respective inputs of the machine learning network layer 906 can be connected to respective outputs of the machine learning network layer 906 via respective weights. The respective inputs of the machine learning network layer 906 can also be connected to respective outputs of the machine learning network cell 904 and/or the machine learning network cell 902. In an embodiment where historical data for visits to a provider entity is not available, the machine learning model 900 can employ a single machine learning network cell that provides data to the machine learning network layer 906. Furthermore, in such an embodiment, the single machine learning network cell can be configured, for example, as a random forest predictor and/or another type of predictor for the provider prediction 908.

The machine learning network layer 906 can generate the provider prediction 908 based on the model provided by the machine learning network cell 902 and/or the machine learning network cell 904. The provider prediction 908 can be, for example, a prediction related to an optimal provider entity for a patient entity. In an embodiment, the model data 118 can include the provider prediction 908. For instance, the provider prediction 908 can be a machine learning model that predicts an optimal provider entity for a patient entity. In another embodiment, the provider prediction 908 can be configured as a multi-output target. For example, the provider prediction 908 can be a softmaxed vector that includes one data element per provider entity. In another embodiment, the provider prediction 908 can be configured as an embedded provider target. For example, the provider prediction 908 can rank provider entities based on a Euclidean embedding distance or a cosine embedding distance with respect to a patient entity.

The prediction for the next provider can be transformed by the step/operation 408 to rank order providers. For example, the prediction for the next provider can be a set of scores, one score per candidate next provider, one probability per candidate next provider, or a predicted embedding for an optimal provider entity. As such, the step/operation 408 can generate a list of provider entities. The list of provider entities can be ranked in descending order of predicted suitability for the patient entity such that a provider entity listed at a top of the list of provider entities is a recommended provider entity for the patient entity. In an embodiment, the list of provider entities can be ranked in descending order based on respective scores assigned to the respective provider entities such that a provider entity with a highest score is at a top of the list of provider entities. In another embodiment, the list of provider entities can be ranked in descending order based on respective probabilities assigned to the respective provider entities such that a provider entity with a highest probability is at a top of the list of provider entities. In yet another embodiment, the step/operation 408 can calculate distance between a particular provider embedding and one or more other provider embeddings. The distance between the particular provider embedding and the one or more other provider embeddings can be, for example, a Euclidean distance, a cosine distance, a Manhattan distance, or another type of distance metric for a vector space. In an aspect, the list of provider entities can be ranked in ascending order of distance where a closest provider embedding can correspond to a recommended provider entity for the patient entity. In a non-limiting example, the ranked list of provider entities provided by the step/operation 408 can include a first entry (e.g., a top entry) for a first provider entity associated with a score equal to 0.95, a next entry for a second provider entity associated with a score equal to 0.90, a next entry for a third provider entity associated with a score equal to 0.80, a next entry for a fourth provider entity associated with a score equal to 0.75, a next entry for a fifth provider entity associated with a score equal to 0.70, etc.

The ranked list of provider entities provided by the step/operation 408 can be transformed by the step/operation 410 for constraint filtering. The constraint filtering can be a process of removing one or more provider entities from the ranked list of provider entities based on one or more constraints. The one or more constraints can be associated with availability data, geographic location data, service type data, ratings data, procedure data, and/or other data. For example, the one or more constraints can include a provider entity not accepting new patients, a provider entity not being within a geographic proximity, a provider entity being out of network for the patient entity, a provider entity not being a correct category of provider, a provider entity not being associated with a sufficiently high user-review rating, a provider entity not providing a particular procedure requested by the patient entity, and/or one or more other constraints. In an aspect, the recommendation data 120 can be provided as a result of the constraint filtering performed by the step/operation 410. For instance, the recommendation data 120 can include a filtered version of the ranked list of provider entities. In an embodiment, the recommendation data 120 can be configured in accordance with a system 1000 depicted in FIG. 10. The system 1000 includes a list 1002. The list 1002 can be, for example, a filtered version of a ranked list of provider entities to recommend to a patient entity 1001. In the embodiment shown in FIG. 10, the list 1002 includes a first entry 1004 for a first provider entity (e.g., Provider Entity C) that is associated with a first score (e.g., a score equal to 8), a second entry 1006 for a second provider entity (e.g., Provider Entity A) that is associated with a second score (e.g., a score equal to 5), a third entry 1008 for a third provider entity (e.g., Provider Entity D) that is associated with a first score (e.g., a score equal to 2), and a fourth entry 1010 for a fourth provider entity (e.g., Provider Entity F) that is associated with a fourth score (e.g., a score equal to 1). In an aspect, the first provider entity (e.g., Provider Entity C) associated with the first entry 1004 can be at a top of the list 1002. Furthermore, the first provider entity (e.g., Provider Entity C) associated with the first entry 1004 can be a recommended provider entity for the patient entity 1001. In certain embodiments, the scores associated with the provider entities can be likelihood to recommend (LTR) scores with a value from a range of 0 to 10, where 10 corresponds to a most positive score. For example, the first score for the first provider entity (e.g., Provider Entity C) associated with the first entry 1004 can be a first LTR score, the second score for the second provider entity (e.g., Provider Entity A) associated with the second entry 1006 can be a second LTR score, etc. As such, the LTR scores can be a metric to measure an optimal recommendation for the patient entity 1001.

In certain embodiments, the LTR scores can be employed to update a graph model to facilitate generating provider embedding and/or generating a next provider model. In this regard, FIG. 11 illustrates an example system 1100 that includes an LTR model 1102, in accordance with one or more embodiments of the present invention. The LTR model 1102 can be associated with the constraints filtering for the step/operation 410, for example. In an aspect, feature extraction data 1108 and/or LTR data 1110 can be provided to the LTR model 1102. The feature extraction data 1108 can include one or more features extracted from a graph model 1112. For example, the feature extraction data 1108 can include one or more features associated with a patient entity related to the graph model 1112. The LTR data 1110 can include, for example, one or more weights associated with the one or more features. The graph model 1112 can be a graphical structure that graphically represents relationships between attributes for a provider-patient recommendation. For instance, the graph model 1112 can graphically represents relationships between attributes included in medical record data 1101. The attributes can include, for example, a patient entity, a provider entity, a claim, a diagnosis, a symptom, a clinic, a geographic location, and/or one or more other attributes. Based on the feature extraction data 1108 and/or the LTR data 1110, the LTR model 1102 can provide score weights 1114 for the graph model 1112. The score weights 1114 can be, for example, modified weights for the one or more features associated with the graph model 1112. In certain embodiments, a similarity algorithm (e.g., a cosine similarity algorithm, etc.) can be applied to the graph model 1112 to determine other similar patient entities based on corresponding feature likeness (e.g., likeness of LTR weight features).

In certain embodiments, the constraint filtering can include performing one or more actions related to patient substitution analysis rather than removing a particular provider entity from the ranked list of provider entities. For example, even though a particular provider entity may not be accepting new patients, the step/operation 410 can remove the corresponding constraint for the particular provider entity and can suggest an optimization of movement of one or more patient entities for the particular provider entity to another provider entity. In an aspect, for each provider entity included in the ranked list of provider entities, a corresponding score can be evaluated for one or more other patient entities with a condition similar to the patient entity. A score for the one or more other patient entities can also be modified to generate a new score in response to a determination that the score is below a defined score value. Furthermore, a patient entity with a largest difference between an original score and a new score can be a potential candidate for optimization of movement to another provider entity. In certain embodiments, one or more electronic communications can be transmitted to the one or more other patient entities and/or one or more other provider entities in response to a recommended optimization of movement.

Provider Entity Prediction Using Graph Embedding

FIG. 12 is a flowchart diagram of an example process 1200 for facilitating provider entity prediction using graph embedding. Via the various steps/operations of process 1200, the artificial intelligence recommendation computing entity 106 can process the historical visit data 401 and/or the visit data 405 to generate one or more predictive data analysis conclusions related to a recommendation for a provider entity. In doing so, the artificial intelligence recommendation computing entity 106 can utilize machine learning solutions to infer important predictive insights from medical records data, for example.

The process 1200 begins at step/operation 1202 when the embedding generation engine 110 of the artificial intelligence recommendation computing entity 106 generates embeddings data related to one or more provider entities using one or more graph embedding techniques. The one or more graph embedding techniques can be one or more machine learning techniques associated with deep learning and/or one or more graph walks to transform a graph structure with nodes (e.g., nodes represented by respective provider entities) and/or edges (e.g., edges associated with a degree of similarly between provider entities) into a vector space for the embedding vectors. In an embodiment, the one or more graph embedding techniques can include a random walk graph embedding technique, a DeepWalk graph embedding technique, a Node2Vec graph embedding technique, a Graph2Vec graph embedding technique, a SDNE graph embedding technique, a LINE graph embedding technique and/or one or more other types of graph embedding techniques.

At step/operation 1204, the model generation engine 112 of the artificial intelligence recommendation computing entity 106 trains a machine learning model based on the embeddings data. The machine learning model can be, for example, a provider machine learning model that provides a provider prediction for a patient entity. In an embodiment, the machine learning model can be a deep learning model (e.g., a sequential deep learning model) that provides a provider prediction for a patient entity. The embeddings data can be provided as input to the machine learning model to facilitate training of the machine learning model. Furthermore, in an embodiment, the machine learning model can include one or more machine learning network cells (e.g., one or more RNN cells, one or more LSTM cells, and/or one or more GRU cells) and/or one or more machine learning network layers (e.g., one or more dense layers and/or one or more fully-connected layers).

At step/operation 1206, the recommendation engine 114 of the artificial intelligence recommendation computing entity 106 predicts a set of provider entities for a patient entity based on the machine learning model. In an embodiment, the recommendation engine 114 of the artificial intelligence recommendation computing entity 106 can rank provider entities in the set of provider entities to generate a ranked set of provider entities. The recommendation engine 114 of the artificial intelligence recommendation computing entity 106 can rank the provider entities based on respective scores associated with the provider entities. Additionally or alternatively, recommendation engine 114 of the artificial intelligence recommendation computing entity 106 can rank the provider entities based on respective distance measurements associated with the provider entities. In certain embodiments, the recommendation engine 114 of the artificial intelligence recommendation computing entity 106 can perform one or more actions to provide a recommendation for the patient entity based on the ranked set of provider entities. Additionally, in an embodiment, the recommendation engine 114 of the artificial intelligence recommendation computing entity 106 can filter the ranked set of provider entities to generate a filtered set of provider entities. The recommendation engine 114 of the artificial intelligence recommendation computing entity 106 can filter the ranked set of provider entities, in certain embodiments, based on one or more constraints associated with at least one of availability data for the set of provider entities, geographic location data for the set of provider entities, service type data for the set of provider entities, ratings data for the set of provider entities, and procedure data for the set of provider entities. In certain embodiments, the recommendation engine 114 of the artificial intelligence recommendation computing entity 106 can perform one or more actions to provide a recommendation for the patient entity based on the filtered set of provider entities.

Provider Entity Prediction Using Factorization Machines

FIG. 13 is a flowchart diagram of an example process 1300 for facilitating provider entity prediction using factorization machines. Via the various steps/operations of process 1300, the artificial intelligence recommendation computing entity 106 can process the historical visit data 401 and/or the visit data 405 to generate one or more predictive data analysis conclusions related to a recommendation for a provider entity. In doing so, the artificial intelligence recommendation computing entity 106 can utilize machine learning solutions to infer important predictive insights from medical records data, for example.

The process 1300 begins at step/operation 1302 when the embedding generation engine 110 of the artificial intelligence recommendation computing entity 106 generates embeddings data related to one or more provider entities using one or more factorization machines. The one or more factorization machines can employ one or more machine learning techniques associated with deep learning and/or supervised learning to transform a graph structure with nodes (e.g., nodes represented by respective provider entities) and/or edges (e.g., edges associated with a degree of similarly between provider entities) into a vector space for the embedding vectors. In an embodiment, the one or more factorization machines can generate one or more hash indexes for one or more variables included in historical visit data. Furthermore, the one or more factorization machines can perform matrix factorization to facilitate learning for historical visits associated with provider entities.

At step/operation 1304, the model generation engine 112 of the artificial intelligence recommendation computing entity 106 trains a machine learning model based on the embeddings data. The machine learning model can be, for example, a provider machine learning model that provides a provider prediction for a patient entity. In an embodiment, the machine learning model can be a deep learning model (e.g., a sequential deep learning model) that provides a provider prediction for a patient entity. The embeddings data can be provided as input to the machine learning model to facilitate training of the machine learning model. Furthermore, in an embodiment, the machine learning model can include one or more machine learning network cells (e.g., one or more RNN cells, one or more LSTM cells, and/or one or more GRU cells) and/or one or more machine learning network layers (e.g., one or more dense layers and/or one or more fully-connected layers).

At step/operation 1306, the recommendation engine 114 of the artificial intelligence recommendation computing entity 106 predicts a set of provider entities for a patient entity based on the machine learning model. In an embodiment, the recommendation engine 114 of the artificial intelligence recommendation computing entity 106 can rank provider entities in the set of provider entities to generate a ranked set of provider entities. The recommendation engine 114 of the artificial intelligence recommendation computing entity 106 can rank the provider entities based on respective scores associated with the provider entities. Additionally or alternatively, recommendation engine 114 of the artificial intelligence recommendation computing entity 106 can rank the provider entities based on respective distance measurements associated with the provider entities. In certain embodiments, the recommendation engine 114 of the artificial intelligence recommendation computing entity 106 can perform one or more actions to provide a recommendation for the patient entity based on the ranked set of provider entities. Additionally, in an embodiment, the recommendation engine 114 of the artificial intelligence recommendation computing entity 106 can filter the ranked set of provider entities to generate a filtered set of provider entities. The recommendation engine 114 of the artificial intelligence recommendation computing entity 106 can filter the ranked set of provider entities, in certain embodiments, based on one or more constraints associated with at least one of availability data for the set of provider entities, geographic location data for the set of provider entities, service type data for the set of provider entities, ratings data for the set of provider entities, and procedure data for the set of provider entities. In certain embodiments, the recommendation engine 114 of the artificial intelligence recommendation computing entity 106 can perform one or more actions to provide a recommendation for the patient entity based on the filtered set of provider entities.

Recommendation Prediction Using Machine Learning and Graph Representations

FIG. 14 is a flowchart diagram of an example process 1400 for facilitating recommendation prediction using machine learning and graph representations. Via the various steps/operations of process 1400, the artificial intelligence recommendation computing entity 106 can process the historical visit data 401 and/or the visit data 405 to generate one or more predictive data analysis conclusions related to a recommendation for a provider entity. In doing so, the artificial intelligence recommendation computing entity 106 can utilize machine learning solutions to infer important predictive insights from medical records data, for example.

The process 1400 begins at step/operation 1402 when the embedding generation engine 110 of the artificial intelligence recommendation computing entity 106 generates embeddings data related to one or more provider entities. In an embodiment, the embedding generation engine 110 of the artificial intelligence recommendation computing entity 106 generates the embeddings data based on one or more graph embedding techniques. In another embodiment, the embedding generation engine 110 of the artificial intelligence recommendation computing entity 106 generates the embeddings data based on one or more factorization machines. In an embodiment, the embeddings data encodes semantic relations among latent features for provider entities. Additionally or alternatively, in an embodiment, the embeddings data comprises at least a first embedding vector that provides a first a vector representation for a first provider entity, and a second embedding vector that provides a second a vector representation for second first provider entity. At step/operation 1404, the model generation engine 112 of the artificial intelligence recommendation computing entity 106 generates a provider model based on the embeddings data. The provider model can be, for example, a provider machine learning model that is trained to provide a provider prediction. At step/operation 1406, the recommendation engine 114 of the artificial intelligence recommendation computing entity 106 predicts a set of provider entities for a patient identity based on the provider model. In an embodiment, the recommendation engine 114 of the artificial intelligence recommendation computing entity 106 predicts a set of provider entities for a patient identity based on a provider model that is trained using the embeddings data. In an embodiment, a first concatenation of user data for the patient entity and the first embedding vector for the first provider entity is provided to a first machine learning network cell of the provider machine learning model. Furthermore, a second concatenation of the user data for the patient entity and the second embedding vector for the second provider entity is provided to a second machine learning network cell of the provider machine learning model. In another embodiment, a machine learning network layer communicatively coupled to the second machine learning network cell provides a prediction for the set of provider entities.

At step/operation 1408, the recommendation engine 114 of the artificial intelligence recommendation computing entity 106 ranks provider entities in the set of provider entities to generate a ranked set of provider entities. In an embodiment, the recommendation engine 114 of the artificial intelligence recommendation computing entity 106 can rank the provider entities based on respective scores associated with the provider entities. Additionally or alternatively, the recommendation engine 114 of the artificial intelligence recommendation computing entity 106 can rank the provider entities based on respective distance measurements associated with the provider entities. At step/operation 1410, the recommendation engine 114 of the artificial intelligence recommendation computing entity 106 filters the ranked set of provider entities to generate a filtered set of provider entities. In an embodiment, the recommendation engine 114 of the artificial intelligence recommendation computing entity 106 can filter the ranked set of provider entities based on one or more constraints associated with at least one of availability data for the set of provider entities, geographic location data for the set of provider entities, service type data for the set of provider entities, ratings data for the set of provider entities, and procedure data for the set of provider entities. At step/operation 1412, the recommendation engine 114 of the artificial intelligence recommendation computing entity 106 performs one or more actions to provide a recommendation for the patient entity based on the filtered set of provider entities.

Although the techniques described herein for providing recommendations are explained with reference to a patient entity and provider entities, a person of ordinary skill in the relevant technology will recognize that the disclosed techniques have applications far beyond merely providing recommendations related to a patient entity and provider entities. As an illustrative example, the disclosed techniques can be used in various recommendations applications and/or with respect to one or more different types of entities.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for facilitating recommendation predictions using machine learning, the computer-implemented method comprising:

generating embeddings data that encodes semantic relations among latent features for provider entities, wherein the embeddings data comprises at least a first embedding vector that provides a first vector representation for a first provider entity and a second embedding vector that provides a second vector representation for a second provider entity;

generating, using a provider machine learning model that comprises a machine learning network layer communicatively coupled to a first machine learning network cell and a second machine learning network cell, a prediction of a set of provider entities for a patient entity based at least in part on (a) a first vector associated with the first provider entity and generated by the first machine learning network cell using a first concatenation of user data for the patient entity and the first embedding vector and (b) a second vector associated with the second provider entity and generated by the second machine learning network cell using a second concatenation of the user data and the second embedding vector, wherein the set of provider entities comprises the first provider entity and the second provider entity;

ranking each provider entity in the set of provider entities to generate a ranked set of provider entities; and initiating the performance of one or more actions to provide a recommendation for the patient entity based at least in part on the ranked set of provider entities.

2. The computer-implemented method of claim 1, wherein generating the embeddings data is based at least in part on one or more graph embedding techniques that transform a graph structure of the latent features into the embeddings data for the provider machine learning model.

3. The computer-implemented method of claim 1, wherein generating the embeddings data is based at least in part on one or more factorization machines that transform a graph structure of the latent features into the embeddings data for the provider machine learning model.

4. The computer-implemented method of claim 1, wherein ranking each provider entity in the set of provider entities is based at least in part on a respective score associated with each provider entity.

5. The computer-implemented method of claim 1, wherein ranking each provider entity in the set of provider entities is based at least in part on a respective distance measurement associated with each provider entity.

6. The computer-implemented method of claim 1, further comprising:
filtering the ranked set of provider entities to generate a filtered set of provider entities.

7. The computer-implemented method of claim 6, wherein initiating the performance of the one or more actions to provide the recommendation is further based at least in part on the filtered set of provider entities.

8. The computer-implemented method of claim 1, further comprising:
filtering the ranked set of provider entities based at least in part on one or more constraints associated with at least one of geographic location data for the set of provider entities, service type data for the set of provider entities, and procedure data for the set of provider entities.

9. An apparatus for facilitating recommendation predictions using machine learning, the apparatus comprising a processor and a memory including a computer program code, the memory and the computer program code configured to, with the processor, cause the apparatus to:
generate embeddings data that encodes semantic relations among latent features for provider entities, wherein the embeddings data comprises at least a first embedding vector that provides a first vector representation for a first provider entity and a second embedding vector that provides a second vector representation for a second provider entity;
generate, using a provider machine learning model that comprises a machine learning network layer communicatively coupled to a first machine learning network cell and a second machine learning network cell, a prediction of a set of provider entities for a patient entity based at least in part on (a) a first vector associated with the first provider entity and generated by the first machine learning network cell using a first concatenation of user data for the patient entity and the first embedding vector and (b) a second vector associated with the second provider entity and generated by the second machine learning network cell using a second concatenation of the user data and the second embedding vector, wherein the set of provider entities comprises the first provider entity and the second provider entity;
rank each provider entity in the set of provider entities to generate a ranked set of provider entities; and
initiate the performance of one or more actions to provide a recommendation for the patient entity based at least in part on the ranked set of provider entities.

10. The apparatus of claim 9, wherein the embeddings data is generated based at least in part on one or more graph embedding techniques that transform a graph structure of the latent features into the embeddings data for the provider machine learning model.

11. The apparatus of claim 9, wherein the embeddings data is generated based at least in part on one or more factorization machines that transform a graph structure of the latent features into the embeddings data for the provider machine learning model.

12. The apparatus of claim 9, wherein each provider entity is ranked based at least in part on a respective score associated with each provider entity.

13. The apparatus of claim 9, wherein each provider entity is ranked based at least in part on a respective distance measurement associated with each provider entity.

14. The apparatus of claim 9, wherein the memory and the computer program code are configured to, with the processor, cause the apparatus to:
filter the ranked set of provider entities to generate a filtered set of provider entities.

15. The apparatus of claim 14, wherein the recommendation for the patient entity is provided based at least in part on the filtered set of provider entities.

16. A non-transitory computer storage medium comprising instructions for facilitating recommendation predictions using machine learning, the instructions being configured to cause one or more processors to at least perform operations configured to:
generate embeddings data that encodes semantic relations among latent features for provider entities, wherein the embeddings data comprises at least a first embedding vector that provides a first vector representation for a first provider entity and a second embedding vector that provides a second vector representation for a second provider entity;
generate, using a provider machine learning model that comprises a machine learning network layer communicatively coupled to a first machine learning network cell and a second machine learning network cell, a prediction of a set of provider entities for a patient entity based at least in part on (a) a first vector associated with the first provider entity and generated by the first machine learning network cell using a first concatenation of user data for the patient entity and the first embedding vector and (b) a second vector associated with the second provider entity and generated by the second machine learning network cell using a second concatenation of the user data and the second embedding vector, wherein the set of provider entities comprises the first provider entity and the second provider entity;
rank each provider entity in the set of provider entities to generate a ranked set of provider entities; and initiate the performance of one or more actions to provide a recommendation for the patient entity based at least in part on the ranked set of provider entities.

17. The non-transitory computer storage medium of claim 16, wherein the embeddings data is generated based at least in part on one or more graph embedding techniques that transform a graph structure of the latent features into the embeddings data for the provider machine learning model.

18. The non-transitory computer storage medium of claim 16, wherein the embeddings data is generated based at least in part on one or more factorization machines that transform a graph structure of the latent features into the embeddings data for the provider machine learning model.

19. The non-transitory computer storage medium of claim 16, wherein the operations are further configured to:
filter the ranked set of provider entities to generate a filtered set of provider entities.

20. The non-transitory computer storage medium of claim 19, wherein the recommendation for the patient entity is provided based at least in part on the filtered set of provider entities.

* * * * *